(12) United States Patent
Kneckt et al.

(10) Patent No.: US 8,730,905 B2
(45) Date of Patent: May 20, 2014

(54) TRANSMISSION RESOURCE RESERVATION SCHEME

(75) Inventors: Jarkko Kneckt, Espoo (FI); Mika Kasslin, Espoo (FI); Janne Marin, Espoo (FI)

(73) Assignee: Nokia Corporation, Espoo (FI)

( * ) Notice: Subject to any disclaimer, the term of this patent is extended or adjusted under 35 U.S.C. 154(b) by 593 days.

(21) Appl. No.: 12/939,314

(22) Filed: Nov. 4, 2010

(65) Prior Publication Data

US 2012/0113952 A1 May 10, 2012

(51) Int. Cl.
*H04W 4/00* (2009.01)
(52) U.S. Cl.
USPC .......... 370/330; 370/336; 370/338; 370/341; 370/348
(58) Field of Classification Search
USPC ................. 370/328, 329, 330, 348, 465, 468; 455/68, 73, 434, 464
See application file for complete search history.

(56) References Cited

U.S. PATENT DOCUMENTS

| | | | | |
|---|---|---|---|---|
| 7,050,452 | B2 * | 5/2006 | Sugar et al. | 370/465 |
| 7,116,682 | B1 * | 10/2006 | Waclawsky et al. | 370/468 |
| 2005/0208956 | A1 * | 9/2005 | Takagi et al. | 455/464 |
| 2007/0054667 | A1 * | 3/2007 | Lee et al. | 455/434 |
| 2008/0227403 | A1 * | 9/2008 | Taki | 455/68 |
| 2011/0053521 | A1 * | 3/2011 | Cordeiro | 455/73 |

OTHER PUBLICATIONS

IEEE 802.11-09/0992r15, "IEEE P802.11 Wireless LANs, Specification Framework for TGae", Robert Stacey, Intel, Sep. 2010, (27 pages).

* cited by examiner

*Primary Examiner* — Brian D Nguyen
*Assistant Examiner* — Toan Nguyen
(74) *Attorney, Agent, or Firm* — Harrington & Smith

(57) ABSTRACT

A method, apparatus, and computer program for acquiring transmission resources during a transmission period is provided. A first communication apparatus is arranged to utilize at least one other communication apparatus to reserve at least one additional transmission band for the first communication apparatus during the transmission period of the first communication apparatus. Upon reception of a message indicating availability of additional transmission band(s) from the at least one other communication apparatus, the first communication apparatus is configured to increase its transmission band during the transmission period.

26 Claims, 4 Drawing Sheets

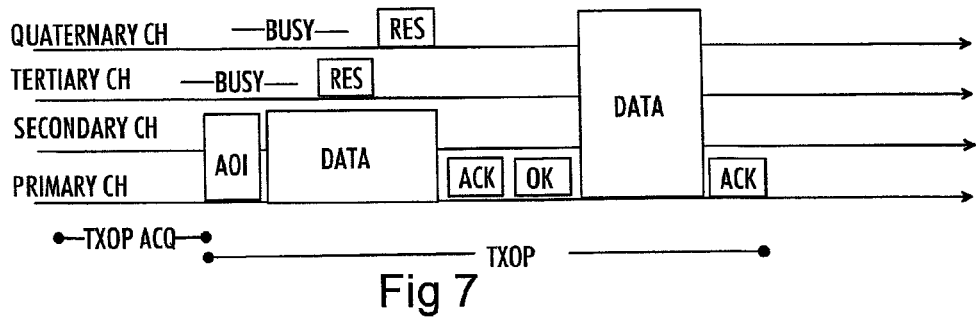
Fig 7
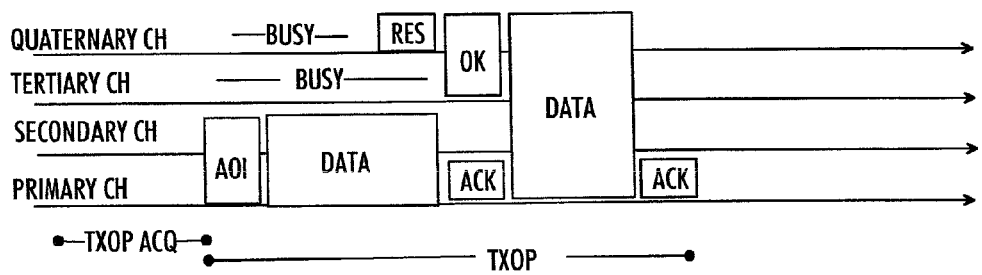
Fig 8
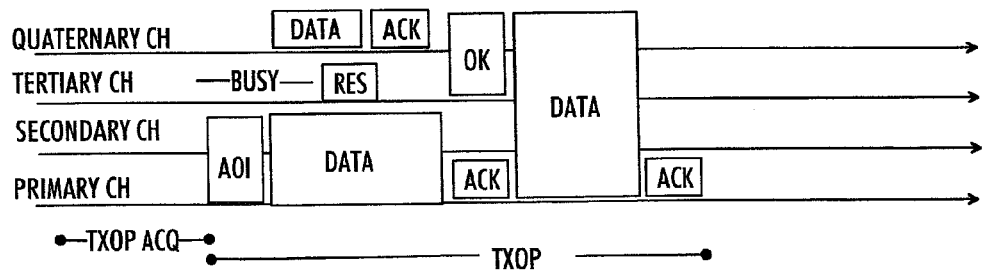
Fig 9
| MAC(6) | REPORT TIME(2) | REPORT CH(2) | DURATION TO PROTECT(2) | OPTIONS(1) | CHANNEL ID1 (2) | CHANNEL ID2 (2) |
Fig 10

TRANSMISSION RESOURCE RESERVATION SCHEME

FIELD

The invention relates to the field of wireless telecommunications and, particularly, to reserving transmission resources in a wireless telecommunication system.

BACKGROUND

Wireless Local Area Network (WLAN) has undergone vast development in order to increase throughput. Task groups such as 802.11b, 802.11a, 802.11g and 802.11n have demonstrated continuous improvement of the WLAN radio throughput. 802.11 ac is another task group that is developing the WLAN radios that operate at a frequency spectrum below 6 GHz and especially at 5 GHz. There exist other task groups within the IEEE 802.11 standardization.

Channelization rules for 802.11ac radios are currently under development. The rules define the frequency channels available for 802.11ac transmitters. The rules are based on a scheme of a primary channel and secondary channels. The scheme follows a principle where each network or basic service set (BSS) has a primary channel and zero or more secondary channels. The primary channel is used for channel contention, and transmission opportunity (TXOP) is gained based on carrier sensing on the primary channel.

BRIEF DESCRIPTION

According to an aspect of the present invention, there is provided a method comprising: acquiring, in a first wireless communication apparatus, a transmission period to transmit data on a first frequency band within a determined transmission time interval; determining to utilize a bandwidth higher than that of the first frequency band during the transmission period; causing transmission of a reservation request message to at least second wireless communication apparatus, wherein the reservation request message instructs the second wireless communication apparatus to reserve at least one additional frequency band for the first wireless communication apparatus during the transmission period; receiving a reservation response message from the at least second wireless communication apparatus, wherein the reservation response message indicates that said at least one additional frequency band is available for the first wireless communication apparatus to use in transmission during the transmission period; and, in response to the reception of the reservation response message, increasing transmission band to comprise said first frequency band and said at least one additional frequency band during the transmission period.

In an embodiment, the method further comprises causing the transmission of the reservation request message at the beginning of the transmission period.

In an embodiment, the method further comprises: causing transmission of data only on the first frequency band until the reservation response message is received during the transmission period; and causing transmission of data on the first frequency band and on the at least one additional frequency band after the reservation response message is received during the transmission period.

In an embodiment, the method further comprises receiving the reservation response message during a time interval between data transmission intervals during the transmission period.

In an embodiment, the reservation request message comprises an identifier of the second wireless communication apparatus, and at least one frequency channel indicator indicating the at least one additional frequency band that is to be reserved by the second wireless communication apparatus.

According to an aspect, there is provided a method, comprising: receiving, from a first wireless communication apparatus in a second communication apparatus, a reservation request message instructing the second wireless communication apparatus to reserve at least one frequency band for the first wireless communication apparatus during a transmission period of the first wireless communication apparatus; monitoring for availability of the at least one frequency band during the transmission period of the first wireless communication apparatus; in response to detection of availability of the at least one frequency band during the transmission period of the first wireless communication apparatus, causing transmission of a reservation response message to the first wireless communication apparatus, wherein the reservation response message indicates that said at least one additional frequency band is available for the first wireless communication apparatus to use in transmission during the transmission period of the first wireless communication apparatus.

In an embodiment, the method further comprises causing, in the second wireless communication apparatus, transmission of a reservation message reserving the at least one frequency band by triggering a network allocation vector setting to the reserved at least one frequency band. In an embodiment, the reservation message is a clear-to-send message. In an embodiment, the second wireless communication apparatus is requested to reserve a plurality of frequency bands, and the method further comprises causing the transmission of the reservation message on each frequency band separately.

In an embodiment, the method further comprises: receiving, in the reservation request message, transmission parameters related to transmission of the reservation response message; and transmitting the reservation response message according to the received transmission parameters. In an embodiment, the transmission parameters relate to at least one of timing and transmission frequency of the reservation response message.

According to an aspect, there is provided an apparatus, comprising means for carrying out any one of the above-described methods.

According to an aspect, there is provided a computer program product embodied on a distribution medium readable by a computer and comprising program instructions which, when loaded into an apparatus, execute any one of the above-described methods. According to an aspect, there is provided a computer program distribution medium or any other manufactured article configured to store the above-described computer program product.

According to an aspect, there is provided an apparatus comprising: at least one processor; and at least one memory including a computer program code, wherein the at least one memory and the computer program code are configured, with the at least one processor, to cause the apparatus to: acquire a transmission period to transmit data on a first frequency band within a determined transmission time interval; determine to utilize a bandwidth higher than that of the first frequency band during the transmission period; cause transmission of a reservation request message from a first wireless communication apparatus to at least a second wireless communication apparatus, wherein the reservation request message instructs the second wireless communication apparatus to reserve at least one additional frequency band for the first wireless communication apparatus during the transmission period;

receive a reservation response message from the at least second wireless communication apparatus, wherein the reservation response message indicates that said at least one additional frequency band is available for the first wireless communication apparatus to use in transmission during the transmission period; and in response to the reception of the reservation response message, cause the first wireless communication apparatus to increase the transmission band to comprise said first frequency band and said at least one additional frequency band during the transmission period.

In an embodiment, the at least one memory and the computer program code are configured, with the at least one processor, to cause the apparatus to cause the transmission of the reservation request message at the beginning of the transmission period.

In an embodiment, the at least one memory and the computer program code are configured, with the at least one processor, to cause the apparatus to: cause transmission of data only on the first frequency band until the reservation response message is received during the transmission period; and cause transmission of data on the first frequency band and on the at least one additional frequency band after the reservation response message is received during the transmission period.

In an embodiment, the at least one memory and the computer program code are configured, with the at least one processor, to cause the apparatus to receive the reservation response message during a time interval between data transmission intervals during the transmission period.

In an embodiment, the reservation request message comprises an identifier of the second wireless communication apparatus, and at least one frequency channel indicator indicating the at least one additional frequency band that is to be reserved by the second wireless communication apparatus.

According to an aspect, there is provided an apparatus, comprising: at least one processor; and at least one memory including a computer program code, wherein the at least one memory and the computer program code are configured, with the at least one processor, to cause the apparatus to: cause reception of a reservation request message from a first wireless communication apparatus the reservation request message instructing the apparatus to reserve at least one frequency band for the first wireless communication apparatus during a transmission period of the first wireless communication apparatus; monitor for availability of the at least one frequency band during the transmission period of the first wireless communication apparatus; in response to detection of availability of the at least one frequency band during the transmission period of the first wireless communication apparatus, cause transmission of a reservation response message to the first wireless communication apparatus, wherein the reservation response message indicates that said at least one additional frequency band is available for the first wireless communication apparatus to use in transmission during the transmission period of the first wireless communication apparatus.

In an embodiment, the at least one memory and the computer program code are configured, with the at least one processor, to cause the apparatus to cause transmission of a reservation message reserving the at least one frequency band by triggering a network allocation vector setting to the reserved at least one frequency band. In an embodiment, the reservation message is a clear-to-send message.

In an embodiment, the apparatus is requested to reserve a plurality of frequency bands, wherein the at least one memory and the computer program code are configured, with the at least one processor, to cause the apparatus to cause the transmission of the reservation message on each frequency band separately.

In an embodiment, the at least one memory and the computer program code are configured, with the at least one processor, to cause the apparatus to: receive, in the reservation request message, transmission parameters related to transmission of the reservation response message; and cause transmission of the reservation response message according to the received transmission parameters. The transmission parameters may relate to at least one of timing and transmission frequency of the reservation response message.

In an embodiment, the apparatus further comprises radio interface components enabling the apparatus to access a radio medium.

LIST OF DRAWINGS

Embodiments of the present invention are described below, by way of example only, with reference to the accompanying drawings, in which FIG. 1A illustrates communication network to which some embodiments of the invention may be applied;

FIGS. 3 to 9 illustrate embodiments for acquiring additional transmission band for a communication apparatus during a transmission opportunity of the communication apparatus;

FIG. 10 illustrates fields of a reservation request message according to an embodiment of the invention.

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1A:
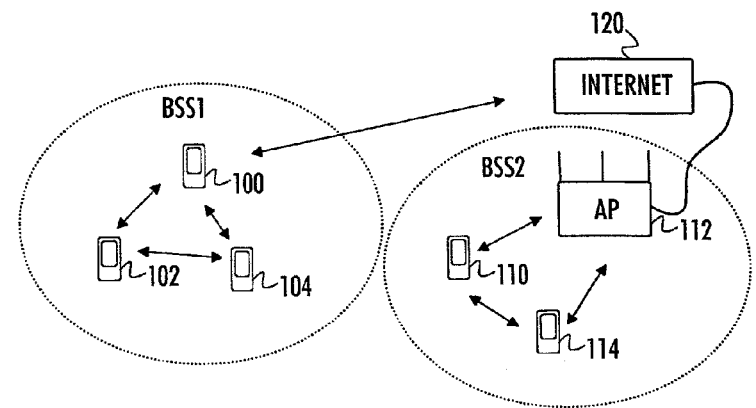
FIG. 1B illustrates a channel allocation principle according to an embodiment.

A general architecture of a wireless telecommunication system to which embodiments of the invention may be applied is illustrated in FIG. 1A. FIG. 1A illustrates two groups of wireless communication devices forming two basic service sets, i.e. groups of wireless communication devices comprising an access point (AP) 100, 112 and terminal stations (STA) 102, 104, 110, 114 communicating with the access points 100, 112 of their respective groups. A basic service set (BSS) is a basic building block of an IEEE 802.11 wireless local area network (WLAN). The most common BSS type is an infrastructure BSS that includes a single AP together with all associated STAs. The AP may be a fixed AP as AP 112, or it may be a mobile AP as AP 100. The APs 100, 112 may also provide access to other networks, e.g. the Internet 120. In another embodiment, at least one of the BSSs is an independent BSS (IBSS) or a mesh BSS (MBSS) without a dedicated AP, and in such embodiments the communication device 100 may be a non-access-point terminal station. While embodiments of the invention are described in the context of the above-described topologies of IEEE 802.11 and, particularly, IEEE 802.11ac, it should be appreciated that other embodiments of the invention are applicable to networks based on other specifications, e.g. other versions of the IEEE 802.11, WiMAX (Worldwide Interoperability for Microwave Access), UMTS LTE (Long-term Evolution for Universal Mobile Telecommunication System), and other networks having cognitive radio features, e.g. transmission medium sensing features and adaptiveness to coexist with radio access networks based on different specifications and/or standards.

Figure 1B:
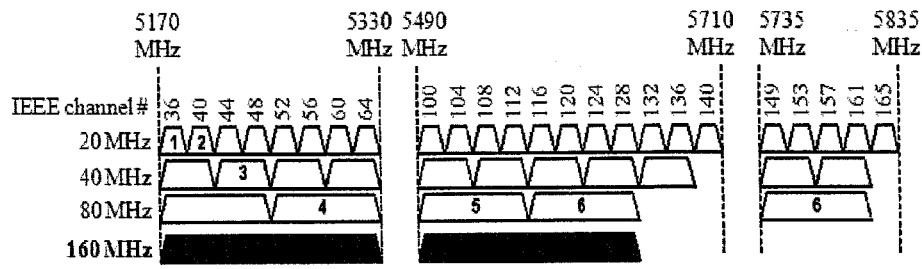

The 802.11n specifies a data transmission mode that includes 20 MHz wide primary and secondary channels. The primary channel is used in all data transmissions, and with clients supporting only the 20 MHz mode. A further definition in 802.11n is that the primary and secondary channels are adjacent. The 802.11n specification also defines a mode in which a STA can have only one secondary channel which results in a maximum bandwidth of 40 MHz. IEEE 802.11ac task group extends such an operation model to provide for wider bandwidths by increasing the number of secondary channels from 1 up to 7, thus resulting in bandwidths of 20 MHz, 40 MHz, 80 MHz, and 160 MHz. FIG. 1B illustrates an exemplary channel structure for 20 MHz, 40 MHz, 80 MHz, and 160 MHz channels. In this example, a 40 MHz transmission band is formed by two contiguous 20 MHz bands (denoted by numerals 1 and 2 in FIG. 1B), and an 80 MHz transmission band is formed by two contiguous 40 MHz bands (numerals 1, 2, 3). However, a 160 MHz band may be formed by two contiguous (numerals 1 to 4) or non-contiguous 80 MHz bands (numerals 1 to 3 for a first 80 MHz band and any one of bands denoted by numerals 5 and 6 for a second 80 MHz band).

As mentioned above, the transmission band of a BSS contains the primary channel and zero or more secondary channels. The primary channel is used for channel contention, and a transmission opportunity (TXOP) is gained based on carrier sensing in the primary channel. Every STA has a time duration (defined by a backoff factor), and if the STA detects that the primary channel has been free for the time duration, it gains the TXOP and starts transmission. If another STA gains the TXOP before that, the channel sensing is suspended, and the STA proceeds with the channel sensing after the TXOP of the other STA has ended. The time duration (the backoff factor) may not be reset at this stage, and the time duration that already lapsed before the suspension is also counted, which means that the STA now has a higher probability of gaining the TXOP. A secondary channel may be used in the transmission if it has been free for a determined time period (may be the same or different time period than that used for gaining the TXOP) just before TXOP start time in order for the contending STA to take the secondary channel in use. Let us consider a scenario where a STA gains a TXOP for the primary channel, but the secondary channel is assessed to be occupied by another STA of another BSS, for example. When the TXOP begins, the STA carries out the transmission on the primary channel for the duration of the TXOP even if the secondary channel is free immediately after the beginning of the TXOP.

Figure 2:
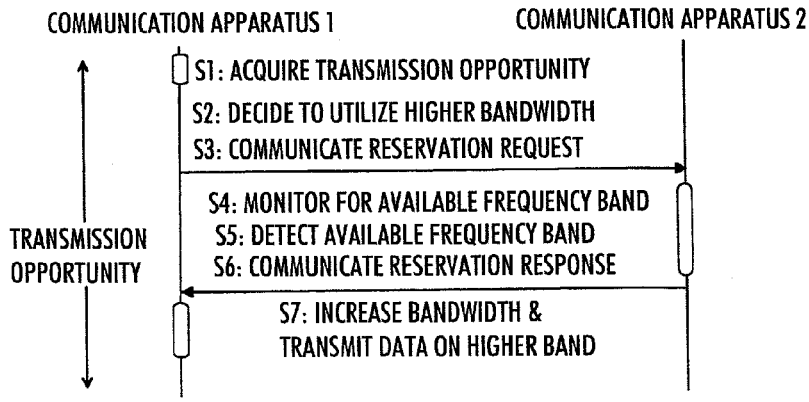
FIG. 2 illustrates a flow diagram of a process according to an embodiment of the invention.

An embodiment of the present invention utilizes other STAs to reserve additional bandwidth for the STA that has the TXOP (TXOP holder) during the TXOP. The TXOP may be defined as a continuous period of time reserved for the TXOP holder to transmit data on the primary channel and zero or more secondary channels. FIG. 2 illustrates an embodiment of a procedure for using another STA to reserve additional bandwidth for the TXOP holder. Note that the procedure includes steps carried out in the TXOP holder (a first communication apparatus 1 in the Figure), steps carried out in the reserving STA (a second communication apparatus 2 in the Figure), and communication between the TXOP holder and the reserving STA. Note that the reserving STA may be a terminal device or an access point of the BSS. Referring to FIG. 2, the first communication apparatus acquires in S1 a transmission period to transmit data on a first frequency band within a determined transmission time interval. An embodiment of the transmission period is the above-mentioned TXOP, and the transmission time interval is referred to as a TXOP interval. Thus, the first communication apparatus becomes the TXOP holder for the TXOP interval. In S2, the TXOP holder determines to utilize a bandwidth higher than that of the first frequency band during the transmission opportunity. In other embodiments, the decision on the bandwidth to be used is made before the channel reservation, and in such embodiments, S2 is executed before S1. It can be understood that a communication apparatus first determines a bandwidth that it needs and, then, attempts to reserve the TXOP for the determined bandwidth. In response to the decision in S2 (and the bandwidth it was able to reserve in S1), the TXOP holder causes transmission of a reservation request message to at least the second communication apparatus in S3. The reservation request message instructs the second communication apparatus to reserve at least one additional frequency band for the first communication device during the transmission opportunity. The second communication apparatus receives the reservation request message from the TXOP holder in S3. In response to the reception of the reservation request message, the second communication apparatus becomes the reserving STA, and it starts monitoring for availability of the at least one frequency band during the transmission opportunity of the first wireless communication apparatus. The monitoring may comprise carrying out channel sounding on the least one frequency band the reserving STA was instructed to reserve. In S5, the reserving STA detects an available frequency band among the at least one frequency band it was instructed to reserve. The reserving STA may also reserve the frequency band by transmitting a signal that prevents other STAs to transmit on the detected frequency band. In response to detection of availability of the at least one frequency band during the transmission opportunity of the first communication apparatus in S5, the reserving STA causes transmission of a reservation response message to the TXOP holder. The reservation response message indicates that the detected frequency band is available for the first wireless communication apparatus to use in transmission during the transmission opportunity of the TXOP holder. The TXOP holder receives the reservation response message in S6. In response to the reception of the reservation response message, the reserving STA increases in S7 the bandwidth of the transmission during the TXOP to comprise said first frequency band and the at least one frequency band indicated in the reservation response message. The TXOP holder thus uses an increased transmission band for the remaining transmission opportunity in S7, thereby transmitting data on a frequency band having the increased bandwidth. Accordingly, steps S1 to S7 may be carried out during the same TXOP.

Advantages of the above-described embodiment include improved spectral efficiency, as the transmission resources of the TXOP holder may be flexibly increased during the TXOP, thereby improving the performance of the TXOP holder and the BSS.

When the channel utilization of the wireless telecommunication system, in which some embodiments of the invention are utilized, is restricted, an embodiment of the invention is to control the channel reservation according to frequency band allocation rules of the wireless telecommunication system. Let us consider the example of FIG. 1B, wherein the channel utilization principle is such that a higher bandwidth is a combined bandwidth of contiguous bands up to 80 MHz band. For the 160 MHz transmissions, the two 80 MHz bands may be contiguous or non-contiguous. As a consequence, the TXOP holder may increase its transmission bandwidth in the order indicated in FIG. 1B by numerals 1 to 6. Let us assume that a transmission band indicated by numeral 1 is the primary channel, and the TXOP holder gains the TXOP initially for the primary channel. As a consequence, the TXOP holder may transmit the reservation request message instructing another STA to reserve at least the frequency band indicated by numeral 2 (a secondary channel) to gain a second 20 MHz channel. Optionally, the reservation request may instruct the other STA to reserve additional frequency bands, e.g. at least one of those indicated by numerals 3 (tertiary channel), 4 (quaternary channel), 5, and 6. In another embodiment, the TXOP holder transmits the reservation message to plurality of other STAs so that the reservation becomes distributed amongst a plurality of reserving STAs. Upon reception of the reservation response message(s) from the reserving STAs, the TXOP holder increases the transmission bandwidth such that the tertiary channel is not taken into use before the secondary channel, and the quaternary channel is not taken into use before the tertiary and the secondary channel. In other words, if the TXOP holder receives a reservation response message for the secondary channel, it may increase the transmission band to comprise the primary and the secondary channel at any time after the reception and processing the reservation response message for the secondary channel. Thereafter, the reception of the reservation response message for the tertiary channel triggers the increase of the transmission bandwidth to comprise the primary, secondary, and tertiary channel. However, if the reservation response message for the tertiary channel is received before the reservation response message for the secondary channel, the TXOP holder may be configured to wait until the reservation response message for the secondary channel is received, thereby complying with the channel utilization specifications of the BSS. With respect to the 160 MHz transmission, the other 80 MHz band (any one of the bands denoted by 4, 5, and 6) may be taken into use after the first 80 MHz band (bands 1 to 3) has been reserved. If the system supports contiguous 160 MHz transmission, the other 80 MHz band may be the band denoted by numeral 4. If the system supports non-contiguous 160 MHz transmission, the other 80 MHz band may be fixed, e.g. the band denoted by numeral 5. If the system supports a channel allocation where the other 80 MHz band may be an arbitrary band, any one of the bands designated by numerals 5 and 6 may be reserved. In other embodiments where all transmission bands may be non-contiguous, the utilization of the reserved channels is more flexible, and the reserved channels may be taken into use in the order that they become reserved for the TXOP holder. Note also that if the TXOP holder gains the TXOP for the maximum bandwidth, e.g. 160 MHz, the transmission of the reservation request message may be prevented for that TXOP.

Let us now consider some embodiments of the invention to implement the reservation of additional transmission band for the TXOP holder with reference to FIGS. 3 to 9. The FIGS. 3 to 9 illustrate time-frequency tables where time runs in the horizontal direction, and channels of the BSS are arranged vertically. In the described embodiments, above-described channel allocation rules (FIG. 1B) are assumed, but it should be understood that the invention is applicable to any other channel allocation rules. In the described embodiments, the TXOP is obtained to at least the primary channel but, in general, the primary channel may be replaced by any other channel of a communication system that does not define primary channels.

Figure 3:
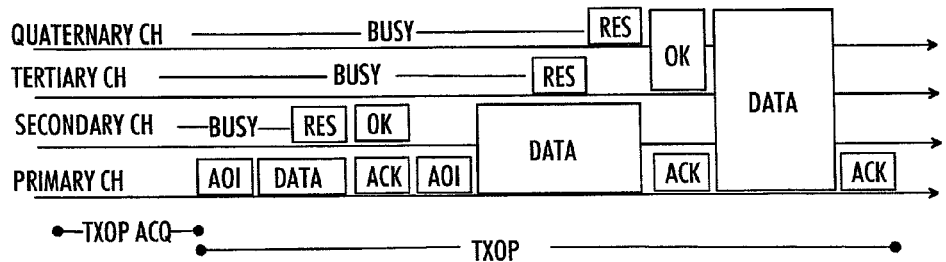

Referring to FIG. 3, a communication device of a BSS acquires the TXOP to the primary channel, while the other channels (secondary, tertiary, and quaternary channel) are detected to be used by another STA (of another BSS). As a consequence, the communication device becomes the TXOP holder. When the BSS supports the IEEE 802.11 networking, the TXOP may be acquired through Enhanced Distributed Channel Access (EDCA) backoff calculation, as described above and as is known in connection with IEEE 802.11 networks. The TXOP holder may define the operation during the TXOP, and it may transmit frames, poll, and receive frames that are destined to it, receive acknowledgements, sense other operating channels for PIFS (point coordination inter frame space) duration through Clear-Channel Assessment (CCA) procedure or, if optional reverse direction grant option is supported, change the TXOP Holder. With respect to the channel sensing, if a sensed channel is detected to contain no transmissions for the PIFS duration, the channel is assumed to be free for utilization. Upon deciding to attempt to increase the transmission band (S2 of FIG. 2), the TXOP holder prepares the reservation request message (AOI, Announcement of Intent message in FIGS. 3 to 9), and transmits the AOI message at the beginning of the TXOP to at least one other STA of the BSS. An example of the structure of the AOI message will be described below. The AOI message may be transmitted on at least the primary channel regardless of the number of channels the TXOP holder has reserved. In an embodiment, the AOI message is transmitted on all channels reserved for the TXOP to ensure CCA and PLCP (Physical Layer Convergence Procedure) protection for all the channels of the TXOP. In this case the AOI message may instruct a second communication apparatus of the BSS to reserve the specified channel, e.g. secondary channel, thus becoming a reserving STA. In response to the reception of the AOI message, the reserving STA starts to sound the secondary channel for any NAV-triggering (network allocation vector) or PLCP header containing transmissions or to detect energy from transmission (CCA). Meanwhile, the TXOP holder transmits data to a receiving STA of the BSS. The receiving STA may be other STA than the reserving STA. Upon detection that the secondary channel becomes available, the reserving STA may transmit a reservation message on the secondary channel. The reservation message may be any message that triggers the NAV protection for the secondary channel. One example of such a message is Clear-to-send message (CTS) of IEEE 802.11. As known from the IEEE 802.11 specifications, the transmission of the reservation message triggering the NAV protection reserves the channel for a determined period of time after the transmission of the reservation message, and the duration of the NAV protection may be included in the reservation message.

Upon transmitting the reservation message, the reserving STA may transmit the reservation response message (OK in the Figures) to the TXOP holder. The reservation response message may be communicated (transmitted and received) during a time interval between data transmission intervals during the transmission opportunity. The reservation response message may be a Clear-to-Send message. If the channel is determined not to be free within a given time duration, the reserving STA may omit the transmission of the reservation response message, or the reserving STA may transmit a reservation response message comprising an information element indicating unsuccessful reservation. Transmission timing of the reservation response message may be defined by the TXOP holder in the reservation request message, and the reservation response message may be transmitted at the same time when the TXOP holder receives an acknowledgment to the data it has transmitted. The OK message may be transmitted on the secondary channel (the channel the reserving STA reserved) in this embodiment. After the acknowledgment period and in response to the reception of the reservation response message, the TXOP holder may again carry out step S2 so as to determine whether or not it should try to reserve additional transmission band(s). In this embodiment, the TXOP holder decides to attempt to reserve the tertiary and the quaternary channel and, accordingly, transmits a new AOI message that instructs a STA of the BSS to become the reserving STA and to reserve the tertiary and the quaternary channel for the TXOP holder. In response to the reception of the AOI message, the reserving STA starts to sound the tertiary and the quaternary channels for any NAV-triggering transmissions or other transmissions (CCA). Meanwhile, the TXOP holder transmits data to the receiving STA of the BSS. The receiving STA may be the same that received the initial transmission of data during the TXOP, or it may be a different STA. Upon detection that the tertiary and/or quaternary channel becomes available, the reserving STA may transmit the reservation message on the tertiary/quaternary channel. Again, the reservation message may be any message that triggers the NAV protection for the channel. In this case, it is assumed that the reserving STA is able to reserve both the tertiary and the quaternary channel before the transmission timing of the reservation response message. As a consequence, the reserving STA may transmit the reservation response message on both reserved channels as shown in FIG. 3. This arrangement adds CCA protection to the reserved channels in addition to the NAV protection. The transmission timing may be the acknowledgment period for the data transmitted by the TXOP holder. In response to the reception of the reservation response message, the TXOP holder may subsequently increase the transmission band to comprise the primary to quaternary channels and transmit data with the increased transmission bandwidth. In this embodiment, the acknowledgment messages are transmitted on the primary channel, but in other embodiments, the acknowledgment messages are transmitted with the same bandwidth used for transmitting data. With respect to the last transmission during the TXOP in FIG. 3, the acknowledgment message may thus be transmitted on a transmission band comprising the primary, secondary, tertiary, and quaternary channel. After transmitting the reservation response message or upon expiry of the transmission timing of the reservation response message, the reserving STA may be configured to tune its receiver to the primary channel of the BSS.

In the previous paragraph, the TXOP holder decided to further increase the transmission band and, as a consequence, transmitted the new reservation request message. In other embodiments, the new reservation request message may be transmitted upon failed reservation of the additional transmission band attempted in connection with the first reservation request message. In such embodiments, the transmission timing of the reservation response message may end the channel reservation procedure, and a new reservation request message may be used to attempt the channel reservation again by establishing a new channel reservation procedure. In some other embodiments, the reserving STA may be configured to attempt the channel reservation until the expiry of the TXOP, and transmission of a new reservation request message to reattempt reservation of the same channel(s) may be omitted.

Figure 4:
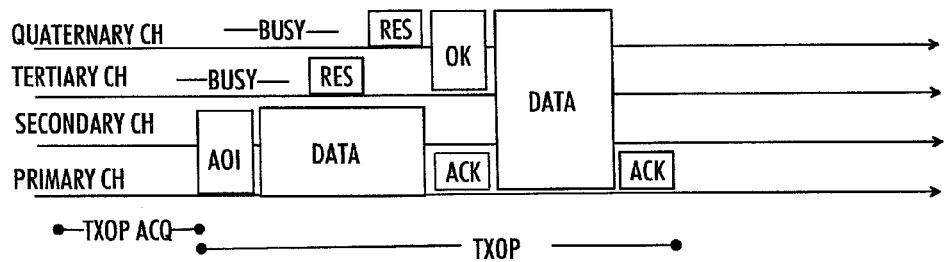
Figure 5:
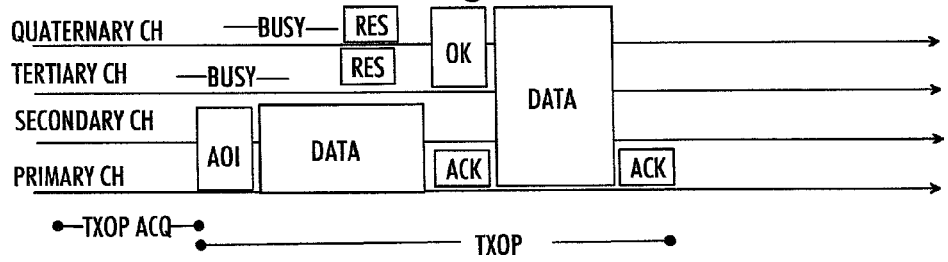

In the embodiment of FIG. 4, the TXOP holder transmits the reservation request message (AOI) with a bandwidth corresponding to the bandwidth of the TXOP (the primary and secondary channels in this case) so as to obtain CCA protection for all the channels of the TXOP. The TXOP holder may also copy multiple 20 MHz AOI frame transmissions to the whole bandwidth that is reserved for the TXOP. The 20 MHz transmissions contain the PLCP header defined in 802.11a and MAC headers, and payload is receivable by devices that have a different primary channel and/or by devices that do not support 802.11ac. In another embodiment, the reservation request message is transmitted on those channels of the TXOP that are not comprised in the primary channel of the BSS of the TXOP holder. The primary channel is typically already covered by the NAV setting so the transmission of the reservation request message is not necessary on the primary channel from the point of view of channel protection. In the embodiments of FIGS. 3 and 4, the reserving STA is configured to reserve the channels by transmitting the reservation messages individually on the channels being reserved (one reservation message at a time). In the embodiment of FIG. 5, the reserving STA is configured to transmit the reservation messages concurrently on a plurality of channels that are to be reserved. Accordingly, each reservation message comprises separate PLCP and MAC (Medium Access Control) headers. An advantage of providing separate messages, e.g. 20 MHz bandwidth, is that even those communication apparatuses supporting only IEEE 802.11a are able to receive the reservation messages and apply the NAV setting. Another embodiment configures the reserving STA to transmit a single message having a bandwidth corresponding to the bandwidth of the plurality of channels being reserved (40 MHz in this example). The advantage of this embodiment is that the reserving device needs to prepare only a single reservation message, and the bandwidth of the message determines the channels that are reserved.

Figure 6:
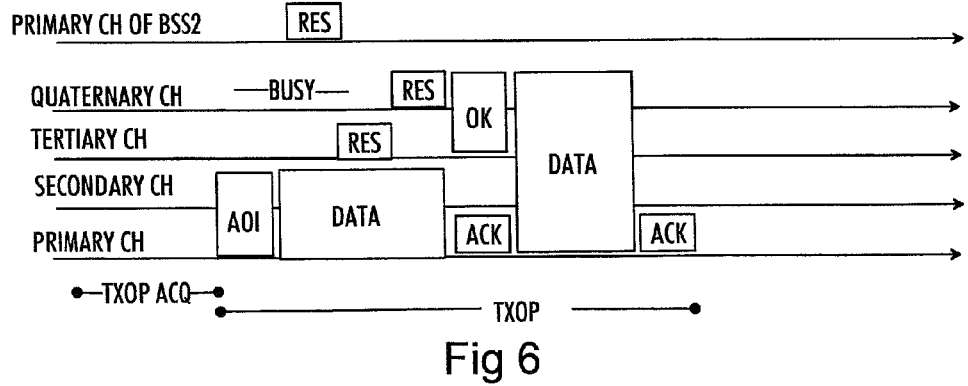

FIG. 6 illustrates the operation of the reserving STA when non-primary channels of two BSSs overlap, and the primary channels of a second BSS is outside the channels of a first BSS. Then, the reserving STA belonging to the first BSS may be configured to first transmit the reservation message on the primary channel of the second BSS and, thereafter, on the channels to be reserved. The channels to be reserved (the tertiary and the quaternary channel in FIG. 6) may even be reserved by another (a third) BSS at the time the reservation message is transmitted on the primary channel of the second BSS.

In previous embodiments, the reservation response message is transmitted on the channel(s) that are reserved by the reserving STA. FIG. 7 illustrates an embodiment where the reserving STA is configured to transmit the reservation response message on the primary channel of the TXOP holder. The transmission timing of the reservation response message may be defined in the reservation request message to enable the reserving STA to transmit the reservation response message without simultaneous transmission at other channels with other transmissions. In this embodiment, the transmission timing of the reservation response message is after the acknowledgment period, but it should be appreciated that the transmission timing and the transmission channel of the reservation response message may be determined to be other than that illustrated in FIG. 7. Moreover, the transmission timing and the transmission channel of the reservation response message may be configured adaptively by the TXOP holder within the specifications of the communication system of the BSS. In an embodiment, the TXOP holder is configured to configure the transmission timing and the transmission channel at times as illustrated in FIGS. 3 to 6, while at other times, the transmission timing and the transmission channel of the reservation response message as illustrated in FIG. 7. In other words, the transmission timing and the transmission channel may be selected flexibly from a plurality of transmission timings and transmission channels. An advantage in transmitting the reservation response message and other messages received by the TXOP holder concurrently on parallel channels is efficient utilization of resources, while transmission of the reservation response message as illustrated in FIG. 7 results in simplified operation of the TXOP holder, as it needs to tune only to the primary channel (or the channel in which the acknowledgments are communicated).

As mentioned above, the transmission timing of the reservation response message may be fixed so as to align the transmission of the reservation response message with other transmissions during the TXOP. As a consequence, there may exist a situation where a channel to be reserved becomes free for reservation just before the transmission timing of the reservation response message. FIG. 8 illustrates the operation of the reserving STA in such a case. In this case, the reserving STA is configured to reserve both tertiary and quaternary channel. Let us assume that the quaternary channel is detected to be free first and that the reserving STA is configured to reserve it with the reservation message, as described above. However, the tertiary channel is detected to be free just before the transmission timing of the reservation response message so that it is not possible to transmit the reservation message before the transmission timing of the reservation response message. As a consequence, the reserving STA is configured to transmit a radio signal on the tertiary channel during the transmission timing of the reservation response message. If the reservation response message is configured to be transmitted on the reserved channels, the radio signal may be the reservation response message. In such an embodiment, the reservation response message functions as the reservation message as well, e.g. it may configure the NAV setting on the reserved channel. If the reservation response message is configured to be transmitted on the primary channel (or on any other channel than the tertiary channel), the reserving STA is configured to transmit the reservation message (triggering the NAV) or any other signal (arbitrary data, test packet, random data sequence, etc.) on the tertiary channel triggering the NAV or at least CCA on the tertiary channel, thereby reserving the tertiary channel. This functionality of the reserving STA may be instructed by the TXOP holder in the reservation request message, or it may be a default functionality of the reserving STA such that it is not needed to be instructed separately by the TXOP holder.

FIG. 9 illustrates an embodiment where the reserving STA is configured to utilize the channel it has reserved to transmit data to another STA. The transmission time period may be bound to a time period between the communication of the reservation request message and the communication of the reservation response message. In this embodiment, the reserving STA is configured to carry out such transmissions only on the channel(s) it is configured to reserve for the TXOP holder, which may consist of channels other than the primary channel. Similarly, the STAs may be configured to receive such transmissions on channels that do not include the primary channel. Referring to FIG. 9, upon reception of the reservation request message, the reserving STA detects that the quaternary channel is free. In response to the detection, the reserving STA determines that it has a possibility to transmit data on the quaternary channel and, accordingly, it prepares a data packet to be transmitted on the quaternary channel to a receiving STA. The transmission of the data packet may be preceded by transmission of a control message from the reserving STA to the receiving STA to tune to the quaternary channel for data reception. Then, the reserving STA transmits the data packet to the receiving STA and receives an acknowledgment (ACK) on the quaternary channel. Thereafter, the reserving STA transmits the reservation response message at the transmission timing and on the transmission channel configured in the reservation request message.

With respect to the reservation carried out by the reserving STA, the reserving STA may be configured to reserve a channel that is detected to be the primary channel of another BSS through the EDCA procedure (e.g. backoff calculation) in order to gain the TXOP for the channel. An access category (AC) of the transmission opportunity may be provided to the reserving STA in the reservation request message. The access category defines explicitly or implicitly the backoff factor. The access category may define a priority, and the backoff factor may be shorter for a high-priority AC and longer for a low-priority AC. The reserving STA may then transmit the reservation message by calculating the backoff factor according to the received AC. If the AC is not provided the reserving STA may be configured to use a determined default AC and a corresponding backoff factor, e.g. an AC for voice (AC-VO).

The reserving STA may be provided with information should it calculate backoff on a given channel and transmit the reservation message when the backoff is calculated to zero, i.e. TXOP is obtained for the channel. The backoff calculation may be used, if the channel to be reserved is determined to be a primary channel of another BSS. With respect to a non-primary channel, the reserving STA may be configured to transmit the reservation message after a determined duration that the media is detected to have been idle. This mode may be used if the channel is not known to be the primary channel of any other BSS. The time duration may be the PIFS, or it may be the PIFS plus one time slot. If the reserving STA is configured to reserve only channels with which it does not need to use contention, e.g. no primary channels, the reserving STA may transmit reservation message(s) on channel(s) that it has detected to be free for the determined time duration.

As mentioned above, the reserving STA may be configured to reserve a plurality of channels with a single reservation message. In such a case, if at least one of the channels comprises a primary channel and if at least one of the channels to be reserved is detected to be busy so that the reservation message cannot be transmitted on the plurality of channels, the reserving STA may decide not to transmit the reservation message. Furthermore, the reserving STA may be configured to reset the backoff value of the primary channel and recalculate a new TXOP for the primary channel, and to verify that the other channels to be reserved have been free for the determined time duration (e.g. PIFS).

The TXOP holder may instruct a given reserving STA to reserve a plurality of additional channels or transmission bands, in which case the reserving device may be configured to reserve the channels in the order that they can be used in order to avoid unnecessary reservations. On the other hand, the reserving STA may be configured to reserve the channels in the order in which they become available for reservation to increase the probability that the plurality of channels are reserved within the TXOP. The TXOP holder may even assign a plurality of reserving STAs to reserve at least partly the same channels to further improve the probability that the channels will be reserved within the TXOP. For example, when the TXOP holder assigns the reserving STAs to reserve an additional 80 MHz band, it may configure plurality of reserving STAs to reserve the same 80 MHz band each. In an embodiment, the TXOP holder may distribute the transmission band to be reserved to a plurality of sub-bands and assign the reserving STAs to reserve one of the sub-bands. For example, one reserving STA may be configured to reserve a sub-band that is contiguous to the current transmission band of the TXOP, e.g. channels of a contiguous 80 MHz band (see 2, 3, 4 in FIG. 1B) and another reserving STA may be configured to reserve channels of the non-contiguous transmission band, e.g. non-contiguous band (see 5, 6 in FIG. 1B). The TXOP holder may then increase the transmission band in the order in which they may be used on the basis of received reservation response messages.

Let us now consider the structure of the reservation request frame according to an embodiment of the invention. In an embodiment, the reservation request message is an individual frame. In another embodiment, the reservation request message is comprised in another frame, e.g. a power-save multipoll (PSMP) frame of an IEEE 802.11 system. In an embodiment where the TXOP holder transmits also other control messages or frames to other STAs of the BSS, e.g. organizing the STAs of the same BSS to protect the TXOP resources by transmitting reservation messages on primary channels of other BSSs that utilize channels overlapping with the TXOP resources, the reservation request message may be included in such a control message or frame. The reservation request may be comprised in a very-high-throughput (V-HT) frame of IEEE 802.11ac, for example. The destination address of the reservation request message may be a group address or a dedicated address of an individual communication apparatus, depending on the number of reserving STAs instructed with the reservation request message. Table 1 below illustrates an exemplary format of the reservation request message.

TABLE 1

| Order | Information element |
|---|---|
| 1 | Category |
| 2 | Action |
| 3 to N | Element 1 to N-2 |

FIG. 10 illustrates an example of an Element of Table 1. As shown in Table 1, the reservation request message may comprise a plurality of elements of FIG. 10. A MAC address field (6 octets, for example) comprises a MAC address of a reserving STA designated by the TXOP holder to reserve the channel(s). In another embodiment, the MAC address field comprises the MAC address of the destination of the reservation message. If the destination address is set, the reserving STA may be configured to transmit the reservation message, e.g. a Request-to-Send (RTS), to the destination address, and a communication apparatus that is the destination may be configured to acknowledge the RTS message with the CTS message, for example. The TXOP holder may be configured to set the destination MAC address to comprise the MAC address of the AP that operates on the channel to be reserved. As a consequence, the NAV protection is propagated with the RTS/CTS message transmitted by the AP throughout the coverage area of the AP. Field Report Time (2 octets, for example) specifies the duration from the end of the reservation request message frame to the transmission of the reservation response message. Field Report Channel (2 octets, for example) may define a channel on which the reservation response message is to be transmitted. Field Duration to Protect (2 octets, for example) sets the duration for the protection of the reserved channel. The value of the Duration to Protect field may be included in the reservation message transmitted by the reserving STA as such, or the reserving STA may reduce from the value of the Duration to Protect field a time duration that has lapsed from the reception of the reservation request message to a time instant when the reservation message is to be transmitted. In an embodiment, the Duration to Protect field may be omitted, and the reserving STA may be configured to reserve the channel at least up to the transmission timing of the reservation response message instructed by the Report Time field. Options field (1 octet, for example) may define options with respect to the reservation. The reservation field may have a format as shown in Table 2 below. Field Channel ID 1 (2 octets, for example) may contain a channel number (or another channel identifier) of the primary channel of the other BSS to which the reservation message is transmitted first (see embodiment of FIG. 6). Field Channel ID 2 (2 octets, for example) may contain a channel number (or another channel identifier) of a channel included in a non-contiguous 80 MHz channel that is to be reserved (if such reservation is supported). The channel identifier may identify the lowest channel, the highest channel, or a centre channel of the other 80 MHz band, for example.

TABLE 2

| Bit 0 | Bit 1 | Bit 2 | Bit 3 | Bit 4 | Bit 5 | Bits 6, 7 |
|---|---|---|---|---|---|---|
| Reservation to primary CH of other BSS | CTS to legacy STAs | Reserve secondary CH | Reserve tertiary CH | Reserve quaternary CH | Reserve non-contiguous 80 MHz band | Reserved |

Referring to Table 2 comprising elements of the options field of FIG. 10, bit 0 indicates whether or not the reservation message is transmitted on the primary channel of the other BSS (embodiment of FIG. 6). If this bit indicates that the reservation message should be transmitted on the primary channel of the other BSS, the reserving STA is configured to determine the channel identifier of the primary channel of the other BSS from the Channel ID1 field of FIG. 10. Bit 1 may be set to indicate that CTS messages used to reserve the channel should be transmitted in a format supported by legacy 802.11 devices, e.g. those not supporting IEEE 802.11ac but supporting IEEE 802.11a. Bit 2 indicates whether or not the reserving STA is configured to reserve the secondary channel. If a STA designated by the MAC header of the Element in question is assigned to reserve the secondary channel with a determined value of Bit 2, the STA is configured to carry out the reservation of the secondary channel as described above. Bit 3 indicates whether or not the reserving STA designated by the MAC header is configured to reserve the tertiary channel, and Bit 4 indicates whether or not the reserving STA designated by the MAC header is configured to reserve the quaternary channel. Similarly, Bit 5 indicates whether or not the reserving STA designated by the MAC header is configured to reserve another 80 MHz band. If the BSS supports the channel allocation where the location of the other 80 MHz band is not fixed, the Channel ID2 field of FIG. 10 may be used to indicate a channel of the 80 MHz band, e.g. the lowest or the highest channel on the 80 MHz band. On the other hand, if the BSS supports the channel allocation where the location of the other 80 MHz band is fixed, Channel ID2 may be omitted.

With respect to FIG. 1 and Table 2 above, the lengths of the fields are merely exemplary, and other numbers of bits or octets may be used instead, depending on the implementation.

The TXOP holder may be an access point or a terminal station of the BSS. Similarly, the reserving STAs may in practice comprise the access point and/or one or more terminal stations of the BSS. The access point may determine the location of the primary channels of those other BSSs that have overlapping channels with the BSS of the access point (through channel sounding or reception of beacons from the other BSSs, for example), and transmit channel identifiers of the primary channels of the other BSSs as control signals in order to enable the reserving STAs to transmit the reservation messages on the primary channels of the other BSSs. The access point may also define protection levels for communication in the BSS. For example, the access point may control the utilization of the secondary, tertiary etc. channels by determining whether or not they are allowed to be used. In another embodiment, the access point sets a protection level for each channel. For example, the access point may define settings for NAV protection for each channel. By default, only the primary channel may be protected by the NAV setting, in which case the other channels are protected through CCA. However, the access point may set the NAV protection to other channels as well (secondary, tertiary etc.) to reduce the probability of collisions. The STAs may have a similar functionality that is applied under the control of the access point or independently by each STA.

In order for the reserving STA to benefit from the reservation it has made for the TXOP holder, the TXOP holder may be configured to use the TXOP as a multi-user TXOP which allows the TXOP holder to transmit data to multiple receivers during the TXOP. In this embodiment, the TXOP holder is configured to transmit in the same PPDU some of the data to initial receiver and some of the data to the reserving STA (not necessarily the initial receiver). Thus, the TXOP holder has more options to aggregate MAC PDUs and MAC Service Data Units (SDUs).

The TXOP holder may process traffic to units, wherein each unit may be transmitted within a determined time interval with a 20 MHz bandwidth. When additional bandwidth is reserved for the TXOP holder during the TXOP, the TXOP holder may easily increment the number of transmitted units according to the increased bandwidth, and the originally planned frame transmission at already reserved TXOP bandwidth may be maintained without any modifications caused by the reservation of the additional bandwidth. The aggregation of the traffic into transmission units may be performed even before the TXOP starts and thus, the implementation-specific real time requirements are relaxed.

In some embodiments, the TXOP holder reserves the channels it needs to use in order to satisfy data transmission requirements, e.g. quality-of-service requirements. In other words, the TXOP holder does not necessarily always attempt the reserve all the channels of the BSS, while in some embodiments the attempt to reserve all the channels may be default functionality. The TXOP holder may determine the transmission bandwidth that is actually needed based on channel estimation, transmission power reserves of the TXOP holder device, etc.

The receiving STA may have established direct link with another STA in the network. The direct link enables the said STAs to transmit and receive traffic between each other without having an AP between them to forward frames. The said STAs may monitor the reservation requests and the reserving STA may use the reserved bandwidth to transmit frames in direct link before it notifies successful reservation to the TXOP holder. The direct link operation at the reserved channel improves the system efficiency.

Figure 11:
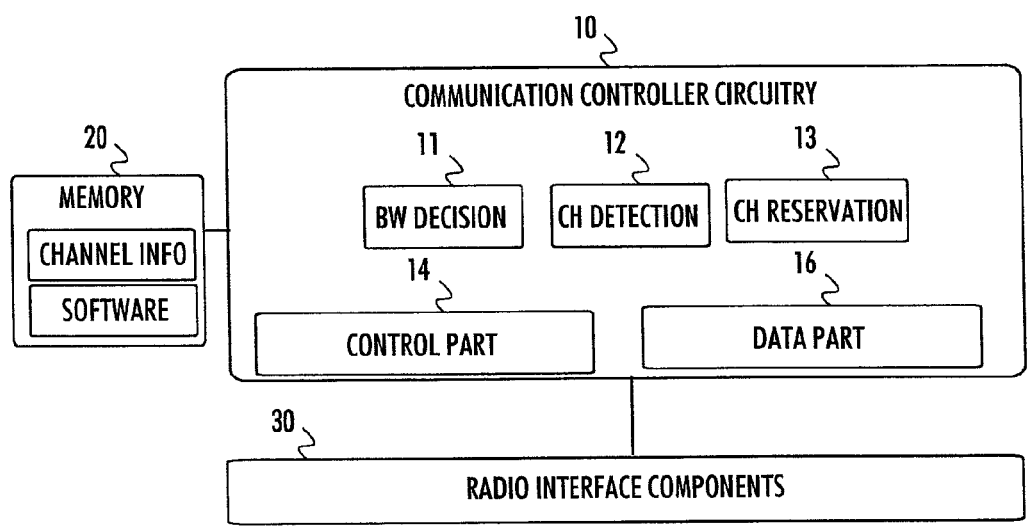
FIG. 11 illustrates a block diagram of an apparatus according to an embodiment of the invention.

FIG. 11 illustrates an embodiment of an apparatus comprising means for carrying out the above-mentioned functionalities of the TXOP holder and/or the reserving STA. The apparatus may be a communication apparatus of an IEEE 802.11 network or another wireless network, e.g. an AP or STA. The communication apparatus may be a computer (PC), a laptop, a cellular phone, a palm computer, a fixed base station operating as the AP, or any other communication apparatus. In another embodiment, the apparatus is comprised in such a communication apparatus, e.g. the apparatus may comprise a circuitry, e.g. a chip, a processor, a micro controller, or a combination of such circuitries in the communication apparatus.

The apparatus may comprise a communication controller circuitry 10 configured to control the communications in the communication apparatus. The communication controller circuitry 10 may comprise a control part 14 handling control signaling communication with respect to transmission, reception, and extraction of control frames including the reservation request messages, reservation messages, and reservation response messages, as described above. The communication controller circuitry 10 may further comprise a data part 16 that handles transmission and reception of payload data during transmission opportunities of the communication apparatus (transmission) or transmission opportunities of other communication apparatuses (reception). The communication controller circuitry 10 may further comprise a bandwidth decision circuitry 11 that determines transmission bandwidth for a transmission opportunity. The bandwidth decision circuitry 11 may be configured to adjust the transmission bandwidth during the transmission opportunity upon reception of a signal notifying about increased bandwidth reservation for the transmission opportunity, as described above. In response to such a notification, the bandwidth decision circuitry 11 may control the data part 16 to process new data packets such that their transmission bandwidth is increased to cover initially and newly acquired transmission band(s).

The communication controller circuitry 10 may further comprise a channel detection circuitry 12 configured to detect available channels. The channel detection circuitry 12 may be configured to tune the communication apparatus to scan for channels according to instructions comprised in a reservation request message received from a current TXOP holder, as described above. The channel detection circuitry 12 may be configured to monitor for a signal in the scanned channel(s) for use as an input in the CCA. The channel detection circuitry 12 may also be configured to monitor for a message that triggers the NAV protection for the scanned channel(s). If either CCA or the NAV indicates that the channel contains transmissions, the channel detection circuitry 12 may be configured to determine that the channel is not available for reservation. On the other hand, if the channel detection circuitry 12 detects no signals in the scanned channel during a determined time period (PIFS for example) and/or the NAV setting is not triggered, the channel detection circuitry 12 may be configured to control a channel reservation circuitry 13 comprised in the communication controller circuitry 10 to reserve the channel(s) by transmitting any one of the above-mentioned reservation messages on the channel(s) and/or on a primary channel of a BSS that was detected to transmit on the channel(s). The location of the primary channel of the other BSS may be comprised in a memory unit 20. The channel detection circuitry 12 may also configured the control part 14 to transmit the reservation response message according to any one of the above-mentioned embodiments to the TXOP holder. The control part may then be configured to transmit the reservation response message by using default transmission parameters and/or transmission parameters included in the reservation request message received from the TXOP holder, as described above.

The circuitries 11 to 16 of the communication controller circuitry 10 may be carried out by the one or more physical circuitries or processors. In practice, the different circuitries may be realized by different computer program modules. Depending on the specifications and the design of the apparatus, the apparatus may comprise some of the circuitries 11 to 13 or all of them. For example, an embodiment of the apparatus is configured to request another communication apparatus to reserve communication resources, but the apparatus itself does not support reservation of communication resources for the other communication apparatus. In this embodiment, circuitries 12 and 13 may be omitted. In another embodiment, the apparatus is configured to reserve additional transmission band(s) for another communication apparatus but is itself configured to use the same transmission band for the duration of the transmission apparatus. In this case, the bandwidth decision circuitry 11 may be omitted or modified accordingly.

The apparatus may further comprise the memory 20 that stores computer programs (software) configuring the apparatus to perform the above-described functionalities of the communication device. The memory 20 may also store communication parameters and other information needed for the wireless communications. The memory 20 may also store a database storing the primary channels of neighboring BSSs, channel utilization rules of the BSS, and/or other channel information, as described above. The apparatus may further comprise radio interface components 30 providing the apparatus with radio communication capabilities within the BSS and with other BSSs. The radio interface components 30 may comprise standard well-known components such as amplifier, filter, frequency-converter, (de)modulator, and encoder/decoder circuitries and one or more antennas. The apparatus may further comprise a user interface enabling interaction with the user of the communication device. The user interface may comprise a display, a keypad or a keyboard, a loudspeaker, etc.

In an embodiment, the apparatus carrying out the embodiments of the invention in the communication apparatus comprises at least one processor and at least one memory including a computer program code, wherein the at least one memory and the computer program code are configured, with the at least one processor, to cause the apparatus to carry out the steps of the process of FIG. 2. In further embodiments, the at least one memory and the computer program code are configured, with the at least one processor, to cause the apparatus to carry out any one of the embodiments related to acquiring additional transmission band for the TXOP holder, as described above in connection with FIGS. 2 to 10. Accordingly, the at least one processor, the memory, and the computer program code form processing means for carrying out embodiments of the present invention in the wireless communication apparatus.

As used in this application, the term 'circuitry' refers to all of the following: (a) hardware-only circuit implementations, such as implementations in only analog and/or digital circuitry, and (b) to combinations of circuits and software (and/or firmware), such as (as applicable): (i) a combination of processor(s) or (ii) portions of processor(s)/software including digital signal processor(s), software, and a memory or memories that work together to cause the apparatus to perform various functions, and (c) to circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term "circuitry" would also cover an implementation of merely a processor (or multiple processors) or a portion of a processor and its (or their) accompanying software and/or firmware. The term "circuitry" would also cover, for example and if applicable to the particular element, a baseband integrated circuit or applications processor integrated circuit for a mobile phone or a similar integrated circuit in server, a cellular network device, or other network device.

The processes or methods described in connection with FIGS. 2 to 10 may also be carried out in the form of a computer process defined by a computer program. The computer program may be in source code form, object code form, or in some intermediate form, and it may be stored in some sort of carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital processing unit or it may be distributed amongst a number of processing units.

The present invention is applicable to wireless telecommunication systems defined above but also to other suitable telecommunication systems. The protocols used, the specifications of mobile telecommunication systems, their network elements and subscriber terminals, develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

The invention claimed is:

1. A method, comprising:

acquiring, in a first wireless communication apparatus, a transmission period to transmit data on a first frequency band within a determined transmission time interval, wherein the transmission period is a transmission opportunity for a wireless local area network;

determining to utilize a bandwidth greater than that of the first frequency band during the transmission period;

causing transmission of a reservation request message to at least second wireless communication apparatus, wherein the reservation request message instructs the second wireless communication apparatus to reserve at least one additional frequency band for the first wireless communication apparatus during the transmission period;

receiving a reservation response message from the at least second wireless communication apparatus, wherein the reservation response message indicates that said at least one additional frequency band is available for the first wireless communication apparatus to use in transmission during the transmission period; and in response to the reception of the reservation response message, increasing a transmission band to comprise both said first frequency band and said at least one additional frequency band during the transmission period thereby transmitting data on the transmission band having the increased bandwidth greater than that of the first frequency band.

2. The method of claim 1, further comprising: causing the transmission of the reservation request message at the beginning of the transmission period.

3. The method of claim 1, further comprising:
causing transmission of data only on the first frequency band until the reservation response message is received during the transmission period; and
causing transmission of data on the first frequency band and on the at least one additional frequency band after the reservation response message is received during the transmission period.

4. The method of claim 1, further comprising receiving the reservation response message during a time interval between data transmission intervals during the transmission period.

5. The method of claim 1, wherein the reservation request message comprises an identifier of the second wireless communication apparatus, and at least one frequency channel indicator indicating the at least one additional frequency band that is to be reserved by the second wireless communication apparatus.

6. A method, comprising:
receiving, from a first wireless communication apparatus in a second communication apparatus, a reservation request message instructing the second wireless communication apparatus to reserve at least one additional frequency band for the first wireless communication apparatus during a transmission period of the first wireless communication apparatus, the at least one additional frequency band being requested for use by the first wireless communication apparatus while transmitting data on a first frequency band, wherein the transmission period is a transmission opportunity for a wireless local area network;
monitoring for availability of the at least one additional frequency band during the transmission period of the first wireless communication apparatus:
in response to detection of availability of the at least one additional frequency band during the transmission period of the first wireless communication apparatus, causing transmission of a reservation response message to the first wireless communication apparatus, wherein the reservation response message indicates that said at least one additional frequency band is available for the first wireless communication apparatus to use in transmission during the transmission period of the first wireless communication apparatus to enable the first wireless communication apparatus to increase the bandwidth of transmission to comprise the first frequency band and the at least one additional frequency band so that the first wireless communication apparatus transmits data during the transmission period on a transmission band having increased bandwidth greater than that of the first frequency band.

7. The method of claim 6, further comprising: causing, in the second wireless communication apparatus, transmission of a reservation message reserving the at least one frequency band by triggering a network allocation vector setting to the reserved at least one frequency band.

8. The method of claim 7, wherein the reservation message is a clear-to-send message.

9. The method of claim 7, wherein second wireless communication apparatus is requested to reserve a plurality of frequency bands, the method further comprising causing the transmission of the reservation message on each frequency band separately.

10. The method of claim 6, further comprising:
receiving, in the reservation request message, transmission parameters related to transmission of the reservation response message; and
transmitting the reservation response message according to the received transmission parameters.

11. The method of claim 10, wherein the transmission parameters relate to at least one of timing and transmission frequency of the reservation response message.

12. An apparatus comprising:
at least one processor; and
at least one memory including a computer program code, wherein the at least one memory and the computer program code are configured, with the at least one processor, to cause the apparatus to:
acquire a transmission period to transmit data on a first frequency band within a determined transmission time interval, wherein the transmission period is a transmission opportunity for a wireless local area network;
determine to utilize a bandwidth greater than that of the first frequency band during the transmission period;
cause transmission of a reservation request message from a first wireless communication apparatus to at least a second wireless communication apparatus, wherein the reservation request message instructs the second wireless communication apparatus to reserve at least one additional frequency band for the first wireless communication apparatus during the transmission period;
receive a reservation response message from the at least second wireless communication apparatus, wherein the reservation response message indicates that said at least one additional frequency band is available for the first wireless communication apparatus to use in transmission during the transmission period; and
in response to the reception of the reservation response message, cause the first wireless communication apparatus to increase a transmission band to comprise both said first frequency band and said at least one additional frequency band during the transmission period thereby transmitting data on the transmission band having the increased bandwidth greater than that of the first frequency band.

13. The apparatus of claim 12, wherein the at least one memory and the computer program code are configured, with the at least one processor, to cause the apparatus to cause the transmission of the reservation request message at the beginning of the transmission period.

14. The apparatus of claim 12, wherein the at least one memory and the computer program code are configured, with the at least one processor, to cause the apparatus to:
cause transmission of data only on the first frequency band until the reservation response message is received during the transmission period; and
cause transmission of data on the first frequency band and on the at least one additional frequency band after the reservation response message is received during the transmission period.

15. The apparatus of claim 12, wherein the at least one memory and the computer program code are configured, with the at least one processor, to cause the apparatus to receive the reservation response message during a time interval between data transmission intervals during the transmission period.

16. The apparatus of claim 12, wherein the reservation request message comprises an identifier of the second wireless communication apparatus, and at least one frequency channel indicator indicating the at least one additional frequency band that is to be reserved by the second wireless communication apparatus.

17. The apparatus of claim 12, wherein the apparatus further comprises radio interface components enabling the apparatus to access a radio medium.

18. An apparatus, comprising:
at least one processor; and
at least one memory including a computer program code, wherein the at least one memory and the computer program code are configured, with the at least one processor, to cause the apparatus to:
cause reception of a reservation request message from a first wireless communication apparatus the reservation request message instructing the apparatus to reserve at least one additional frequency band for the first wireless communication apparatus during a transmission period of the first wireless communication apparatus, the at least one additional frequency band being requested for use by the first wireless communication apparatus while transmitting data on a first frequency band, wherein the transmission period is a transmission opportunity for a wireless local area network;
monitor for availability of the at least one additional frequency band during the transmission period of the first wireless communication apparatus;
in response to detection of availability of the at least one additional frequency band during the transmission period of the first wireless communication apparatus, cause transmission of a reservation response message to the first wireless communication apparatus, wherein the reservation response message indicates that said at least one additional frequency band is available for the first wireless communication apparatus to use in transmission during the transmission period of the first wireless communication apparatus to enable the first wireless communication apparatus to increase the bandwidth of transmission to comprises the first frequency band and the at least one additional frequency band so that the first wireless communication apparatus transmits data during the transmission period on a transmission band having increased bandwidth greater than that of the first frequency band.

19. The apparatus of claim 18, wherein the at least one memory and the computer program code are configured, with the at least one processor, to cause the apparatus to cause transmission of a reservation message reserving the at least one frequency band by triggering a network allocation vector setting to the reserved at least one frequency band.

20. The apparatus of claim 19, wherein the reservation message is a clear-to-send message.

21. The apparatus of claim 19, wherein the apparatus is requested to reserve a plurality of frequency bands, wherein the at least one memory and the computer program code are configured, with the at least one processor, to cause the apparatus to cause the transmission of the reservation message on each frequency band separately.

22. The apparatus of claim 18, wherein the at least one memory and the computer program code are configured, with the at least one processor, to cause the apparatus to:
receive, in the reservation request message, transmission parameters related to transmission of the reservation response message; and
cause transmission of the reservation response message according to the received transmission parameters.

23. The apparatus of claim 22, wherein the transmission parameters relate to at least one of timing and transmission frequency of the reservation response message.

24. The apparatus of claim 18, wherein the apparatus further comprises radio interface components enabling the apparatus to access a radio medium.

25. A computer program product comprising a non-transitory computer-readable storage medium bearing computer program code embodied therein for use with a computer, the computer program code comprising:
code for acquiring a transmission period for a first wireless communication apparatus to transmit data on a first frequency band within a determined transmission time interval, wherein the transmission period is a transmission opportunity for a wireless local area network;
code for determining to utilize a bandwidth greater than that of the first frequency band during the transmission period;
code for causing transmission of a reservation request message from the first wireless communication apparatus to at least second wireless communication apparatus, wherein the reservation request message instructs the second wireless communication apparatus to reserve at least one additional frequency band for the first wireless communication apparatus during the transmission period;
code for receiving a reservation response message from the at least second wireless communication apparatus, wherein the reservation response message indicates that said at least one additional frequency band is available for the first wireless communication apparatus to use in transmission during the transmission period; and
code for, in response to the reception of the reservation response message, increasing a transmission band to comprise both said first frequency band and said at least one additional frequency band during the transmission period thereby transmitting data on the transmission band having the increased bandwidth greater than that of the first frequency band.

26. A computer program product comprising a non-transitory computer-readable storage medium bearing computer program code embodied therein for use with a computer, the computer program code comprising:
code for causing reception of a reservation request message from a first wireless communication apparatus the reservation request message instructing the apparatus to reserve at least one additional frequency band for the first wireless communication apparatus during a transmission period of the first wireless communication apparatus, the at least one additional frequency band being requested for use by the first wireless communication apparatus while transmitting data on a first frequency band, wherein the transmission period is a transmission opportunity for a wireless local area network;
code for monitoring for availability of the at least one additional frequency band during the transmission period of the first wireless communication apparatus;
code for, in response to detection of availability of the at least one additional frequency band during the transmission period of the first wireless communication apparatus, causing transmission of a reservation response message to the first wireless communication apparatus, wherein the reservation response message indicates that said at least one additional frequency band is available for the first wireless communication apparatus to use in transmission during the transmission period of the first wireless communication apparatus to enable the first wireless communication apparatus to increase the bandwidth of transmission to comprise the first frequency band and the at least one additional frequency band so that the first wireless communication apparatus transmits data during the transmission period on a transmission band having increased bandwidth greater than that of the first frequency band.

* * * * *